United States Patent Office 3,501,841
Patented Mar. 24, 1970

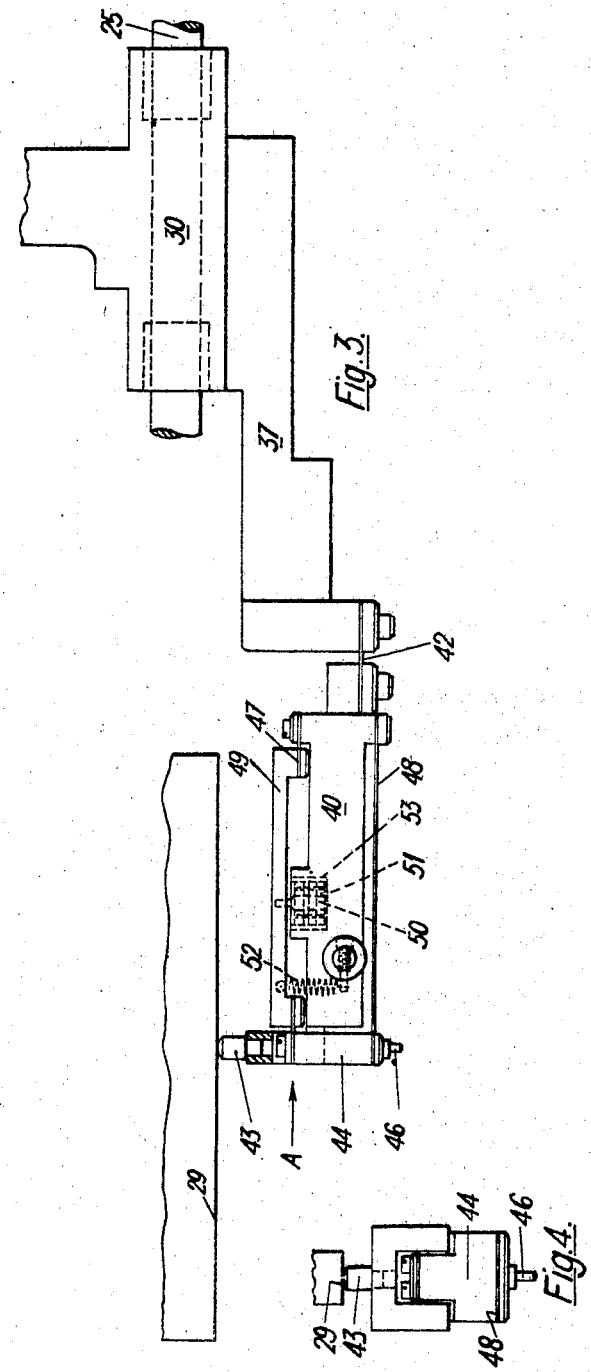

3,501,841
SURFACE-TESTING APPARATUS
John Reginald Adams, Leicester, England, assignor to The Rank Organisation Limited, London, England, a British company
Filed Feb. 20, 1967, Ser. No. 617,210
Claims priority, application Great Britain, Feb. 22, 1966, 7,640/66
Int. Cl. G01b 5/20, 5/28
U.S. Cl. 33—174
9 Claims

ABSTRACT OF THE DISCLOSURE

Surface-testing apparatus for testing the straightness of a surface has a pick-up head which effects linear traversing movements parallel to a surface to be tested. A stator member is hinged to the pick-up head and is spring-biased so that a skid attached to the stator member is maintained in engagement with a fixed flat reference surface extending generally parallel to the test surface. A stylus is movable relative to the stator member perpendicularly to the test surface and engages the test surface so that during a said traversing movement the displacements of the stylus relative to the reference surface are measured directly by a transducer having one part fixed to an arm carrying the stylus and another relatively movable part attached to the stator member.

---

This invention relates to surface-testing apparatus, more especially for testing the straightness of a surface. In such apparatus, usually, a stylus is traversed along the surface to be tested and the working movements of the stylus approximately normal to the surface actuate a transducer controlling a measuring or indicating instrument. For measuring the roughness or waviness of the surface, a relatively short traverse is sufficient and it is customary to provide both a recording instrument, which records a greatly enlarged profile of the surface, and an integrating instrument, which indicated the average roughness of the surface. For testing straightness, a much longer traverse is usually needed, and the recording instrument often will suffice to give the necessary information.

The present invention has for its object to provide an improved surface-testing apparatus, more especially (but not exclusively) for testing the straightness of a surface.

The invention relates more particularly to surface-testing apparatus of the kind comprising a base, a work support on the base for carrying a workpiece whose surface is to be tested, a pick-up head movably supported from the base means for applying to the pick-up head a nominally straight traversing movement relative to the base, a stator member hinged to the pick-up head about an axis perpendicular to the direction of said traversing movement, a stylus, a connecting member carrying the stylus, a transducer having a relatively stationary element mounted on the stator member and a relatively movable element attached to the connecting member, and hinge means displaceably attaching the connecting member to the stator member whereby, with the stylus in engagement with the test surface the transducer is operated by working movements of the stylus relative to the stator member approximately normal to the test surface during said traversing movement of the pick-up head. Such surface-testing apparatus is known in the art from U.S. Patent No. 3,283,568.

In using surface-testing apparatus of the above-defined type for testing the straightness of a surface, it is desirable to provide an accurate reference surface relative to which working movements of the stylus may be measured by the stylus. A more specific object of the invention is accordingly to provide surface-testing apparatus of the above type which is adapted particularly for the measurement of the straightness of the surface by providing a continuous reference against which movements of the stylus may be measured.

The present invention comprises the improvement in such apparatus which consists in the provision of an accurate flat reference surface fixed relative to said base and extending substantially parallel to the direction of said traversing movement of the pick-up head, a skid rigidly attached to the stator member, and means biasing the stator member about its hinged axis to maintain said skid in contact with said reference surface and thereby guide the stator member during said traversing movement.

The apparatus preferably includes a column extending upwardly from the base, a carriage, means for adjusting the position of the carriage relative to the base along said column, a casing carried by the carriage and means supporting the pick-up head from the casing for linear movement relative to the casing in the direction of said traversing movement.

Means are preferably provided for ensuring approximate parallelism between the reference surface and the test surface, such means comprising a hinge connection between the carriage and the casing having a hinge axis at right angles to the direction of traversing of the pick-up head, and two parts in abutting engagement respectively carried by the casing and by the case. For instance one of the two parts in abutting engagement may be constituted by a steadying arm adjustably mounted on the casing and abutting against the test surface or a surface of the work support adjacent thereto, and the adjustment of the steadying arm will enable it to be correctly positioned, for example, both when the test surface is a flat surface and when the test surface is a cylindrical surface. It will be appreciated that, when the apparatus is used for straightness testing with a relatively long traverse any slight bending of the pick-up head in its most extended position relatively to the casing would introduce an error into the measurement, and it is desirable therefore to make the pick-up head very rigid. Since the consequent increase in weight of the pick-up head might cause the steadying arm to damage the test surface, when abutting against such surface, it is desirable to provide spring means opposing the weight of the pick-up head and the parts carried thereby for determining the contact pressure between the steadying arm and the test surface.

Instead of using a steadying arm projecting from the casing to the test surface or to an adjacent surface on the work support, one of the two abutting parts may be constituted by a fixed bracket on the base or on the work support extending close to the casing for cooperation with an adjustable abutment on the casing.

When the apparatus is to be adjusted, the steadying arm is adjusted so that when the reference surface is exactly parallel with the surface under test, the stylus to skid relationship is such that the transducer causes the indicator of the indicating instrument to come to the centre of its traverse.

In actual use, when the apparatus is to be levelled, the entire carriage is raised or lowered until the stylus comes gently into contact with the surface under test, and it is raised or lowered until the indicator of the indicating instrument comes to the centre of its traverse, corresponding to no deflection. No further adjustment is necessary usually, and for this reason this process has been referred to as "automatic." More strictly speaking, it is a one step setting, and is one of the important advantages of the apparatus according to the present invention.

In another method of adjusting the apparatus, means responsive to the movement of the casing about its hinge relatively to the carriage are preferably provided for indicating when the movement of the carriage along the column has brought the casing into a position in which the reference surface is approximately parallel to the test surface. This provides for an approximate levelling of the casing and a final more accurate levelling may be achieved by effecting a preliminary traversing movement to determine whether the curve on the chart (when a recording instrument is used) is at too great a slope or whether the pointer goes off the scale (when an indicating meter is used), and if so making the necessary further small adjustment of the carriage along the column.

It should be mentioned that, in the arrangements above described, it is desirable, for maximum accuracy for the skid to be mounted directly in line with the working movements of the stylus approximately normal to the test surface, for example with the skid and the stylus projecting oppositely, respectively from the top and from the bottom of the pick-up head. In some instances, however, as for example for testing the straightness of the interior surface of a small bore, such an arrangement is inconvenient. To overcome this difficulty, an extension fitting for the pick-up head may be provided, comprising a first member attached to the pick-up head, a second member carrying an auxiliary skid engaging with the reference surface, ligament hinges in parallel linkage formation by means of which such second member is carried by the first member, an auxiliary stylus, and a two-armed lever hinged to the second member and carrying the auxiliary stylus on one arm, whilst the other arm abuts against the main stylus, whereby with the auxiliary stylus in engagement with the test surface the working movements thereof approximately normal to the test surface during the traversing movement are transmitted through the main stylus to the transducer for operation of the indicating instrument. In such case, maximum accuracy is achieved when the line joining the auxiliary skid and the hinge of the two-armed lever is at right angles to the reference surface.

The pick-up head may be mounted on the casing in various ways, but in one convenient arrangement the mounting comprises two parallel guide rails in the casing, a sleeve rigidly connected to the pick-up head and mounted to slide along the first guide rail, and a bracket on the sleeve engaging with the second guide rail for preventing rotation of the sleeve around the first guide rail. The two guide rails are of course mounted parallel to the reference surface, and it will be appreciated that the mounting of the skid and the stylus (or of the auxiliary skid and auxiliary stylus) above described is such as to give accurate measurement of the surface straightness (within the limits of accuracy of the reference surface) irrespective of any small errors there may be in the straightness of the guide rails.

The invention may be carried into practice in various ways, but the following may be instanced as a preferred construction of surface-testing apparatus. This construction, although it may be used for measuring the roughness or waviness of a surface, is more especially intended for testing the straightness of a surface, and will be described with reference to its use for this purpose.

FIGURE 3 is a right side elevation view of the stator member and pick-up head.

FIGURE 4 is a front elevation view of the stator member and pick-up head.

Figure 1:
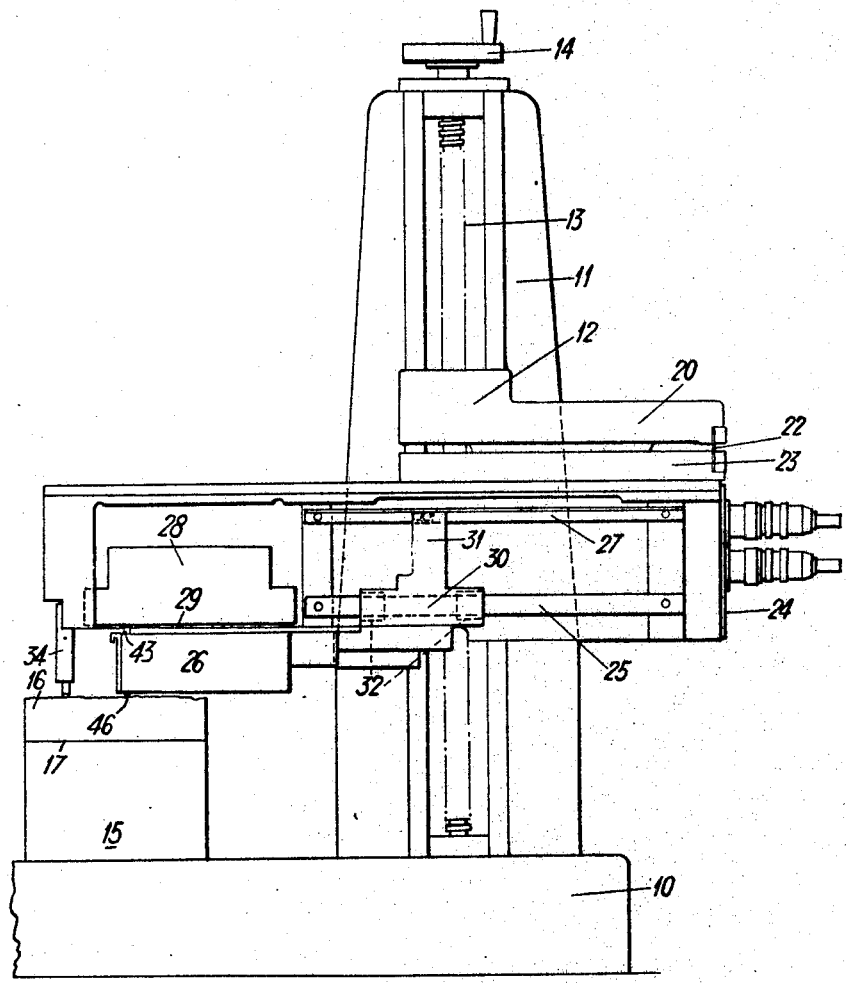
FIGURE 1 is a right side elevation view of the apparatus.
Figure 2:
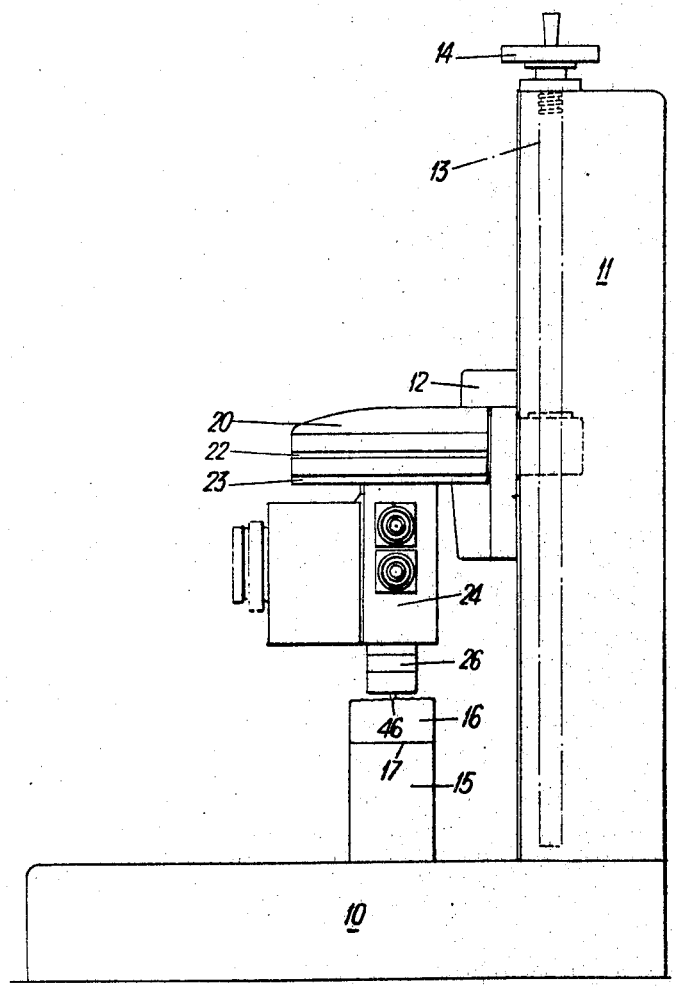
FIGURE 2 is a rear elevation view of the apparatus.

In this construction, the apparatus comprises a base 10, which may be mounted on its own stand or may rest for example on a workbench. It will be assumed, for simplicity of description, that the base rests on a horizontal workbench, and the terms "horizontal" and "vertical" will be used hereinafter in a relative sense with reference to such mounting of the apparatus, but it will be understood that the apparatus may, if desired, be used in an inclined position with its base inclined at a considerable angle to the horizontal.

The base 10 has, formed integral with it, a vertical column 11 which projects upwardly from a convenient position towards the rear end of the base 10, and this column 11 serves to support a carriage 12 which can slide on a flat vertical face of the column 11 and can be adjusted in height up or down the column 11 by means of a lead screw 13 actuated by a handwheel 14, the mounting of the carriage 12 being such that in any position of adjustment the carriage 12 is firmly and rigidly held by the column 11, without shake.

The front portion of the base 10 is provided with T-section grooves or like fittings, not shown, to which a support 15 can be rigidly clamped in a suitable position. In practice, a number of alternative work supports 15 are available, of various shapes and sizes, so that the correct work support 15 can be chosen to suit the shape of the workpiece 16 whose surface is to be tested. For example, in the case when the workpiece 16 consists of a bar having two parallel flat faces, one of which constitutes the surface to be tested, a work support 15 is used having a horizontal flat receiving face 17 provided with an upstanding fence or fences, not shown, so that when the workpiece 16 is placed on the receiving face 17 in engagement with such fence or fences its test surface will occupy the desired position for the test. In the case when the workpiece 16 is of cylindrical shape, a suitable form of work support 15 will be one having a V-groove of suitable size and angle, within which the workpiece 16 can rest. In practice, it will often be the case that a number of workpieces 16, all of the same shape and size, require to be tested in turn, and the work support 15 chosen will then be such that the workpieces 16 can be quickly exchanged one for another in the correct position on the work support 15. It is important that the workpiece 16 should be so located on the work support 15 that the surface to be tested lies in a position such that a line on it to be tested for straightness extends in the nominal direction of traversing used in the apparatus as will be described later, such direction in fact extending from the front to the rear of the base 10.

The carriage 12 adjustably mounted on the column 11 is provided with a lateral bracket 20 having a vertical flat rear face extending at right angles to the said nominal direction of traversing. A spring ligament in the form of a broad flat strip 22 is clamped against such face, with the length of the strip 22 extending horizontally and with a substantial part of the width of the strip 22 projecting freely beyond the lower edge of the rear face of the bracket 20. Such projecting portion of the strip 22 is in turn clamped to one of the limbs of a bar 23 of angle section, the other limb of which is clamped to the flat top surface of a casing 24, the main body of which extends forwardly therefrom, so that its front end portion lies above the position occupied by the workpiece 16 on the work support 15. The ligament strip 22 thus constitutes a hinge about which the casing 24 can turn relatively to the carriage 12.

This casing 24 contains guide rails 25 and 27 along which a pick-up head 26 can be traversed and mechanism for effecting such traversing, and also a member 28 having an accurately straight surface 29 which serves as a reference surface, with which the straightness of the surface to be tested can be compared.

For guiding the traversing movement of the pickup head 26, two parallel guide rails 25 and 27 are used, one above the other, the two guide rails 25 and 27 extending in a generally horizontal direction at right angles to the hinge axis of the casing 24. The lower guide rail 25 is in the form of a rod of circular cross-section along which a sleeve 30 slides, such sleeve 30 having flat external faces to which the pick-up head 26 and also an upwardly extending bracket 31 can be rigidly secured. To minimize friction the sleeve 30 engages with the lower guide rail 25 through bearing pads 32 of plastic material having good anti-friction properties. The upper guide rail 27 is of circular cross-section, and the bracket 31 extending upwardly from the sleeve 30 has a forked upper end, the two limbs of which engage through ball races respectively with the two faces of the vertical limb of the upper guide rail 27, thus holding the sleeve 30 against any rotational movement around the lower guide rail 25.

For effecting the traversing drive, an electric motor is used, driving a drum or pulley around which a cord of nylon or other suitable material is tightly wound, the two ends of such cord passing around guide pulleys and being secured respectively to the two ends of the sleeve 30. The electric motor is provided with means whereby the cord can be driven to traverse the sleeve 30 in the operative direction, that is from the front towards the rear of the apparatus, at a relative fast speed or at either of two alternative relatively slow speeds.

The accurate reference surface 29 is constituted by an optically flat surface formed on one edge face of a relatively thick plate or glass. This glass plate is mounted in the casing 24 with its reference surface 29 downward, such reference surface 29 lying accurately parallel to the guide rails 25 and 27 and therefore to the direction of traversing of the pick-up head 26.

At its front end, the casing 24 is provided with a vertical slideway to which can be fitted a detachable nosepiece 34 carrying an adjusting screw, not shown, bearing on a part of the casing 24, so that the vertical position of the nosepiece 34 on the casing 24 can be adjusted, the nosepiece 34 being firmly secured to the casing 24 in its chosen position of adjustment. Various alternative nosepieces 34 are provided to suit different conditions of use of the apparatus. Thus, for example, when testing a flat surface on a workpiece 16, a nosepiece 34 may be used having a rounded lower end which rests on the test surface itself. In the case of a cylindrical test surface, the procedure is exactly the same, only the further adjustment is required in the horizontal plane to place the line generator on the cylinder substantially parallel to the tracking movement on the pick-up 26. In each case, the operative position of adjustment of the nosepiece 34 is such that, when the necessary levelling operation, now to be described, to achieve parallelism between the reference surface 29 and the test surface has been effected, the reference surface 29 will lie at a predetermined distance above the line of the test surface to be tested.

For the purposes of such levelling adjustment, the casing 24 bears an index mark, not shown, which cooperates with another index mark, not shown, on the carriage 12, such marks registering with one another when the casing 24 is occupying its zero angular position. The desired levelling is effected by operating the hand-wheel 14 for raising or lowering the carriage 12 on the column 11 until the two index marks, register with one another, the effective length of the nosepiece 34 in its operative position of adjustment being such that the reference surface 29 and the test surface will be approximately parallel to one another with the predetermined spacing between them when the two index marks are in register. As will be explained later, this levelling adjustment is in the nature of a coarse adjustment, to which some slight further adjustment may subsequently be found to be necessary.

Since, for testing the straightness of a surface, a relatively long traversing movement of the pick-up head 26 is needed, it will be appreciated that the casing 24 must be of considerable length. Any slight sagging of the casing 24 would, however, introduce an error in the straightness test, and it is therefore essential to construct the casing 24 with a high degree of rigidity. This in its turn unavoidably increases the weight of the casing 24, so that there would be risk of damage to the test surface resulting from heavy contact pressure of the nosepiece 34 thereon, if some counterbalancing of the weight of the casing 24 were not provided. Such counterbalancing can best be effected by providing a tension spring, not shown, between the casing 24 and the carriage 12, whose force opposes the weight of the casing 24 and the parts carried thereby. Means, also not shown, are provided for adjusting the spring tension to enable the contact pressure of the nosepiece 34 an the test surface to be brought to an optimum value, and it will be appreciated that such adjustment of the spring tension will be needed, whenever the apparatus is used in an inclined position.

Turning now to the pick-up head 26, this is shown in FIGURES 3 and 4, and comprises a rear portion 37, which is rigidly secured to the sleeve 30 running on the lower guide rail 25 in the casing 24, and a hollow front portion, not shown, which houses the operative parts of the pick-up. Within this hollow front portion a stator member 40 is hinged at its rear and to the body of the pick-up head by means of a horizontal short, but broad, flat spring ligament 42. At its front end, this stator member 40 rigidly carries an upwardly directed skid 43 which projects through the top of the pickup head and rides along the accurate reference surface 29 on the lower edge of the glass plate in the casing 24. In order to maintain the skid 43 always in engagemnt with such reference surface 29 with the optimum contact pressure, the flat spring ligament 42 is lightly sprung so as to urge the end of the stator member 40 carrying the skid 43 upwards to press the skid 43 into contact with the reference surface 29.

A second member 44 which rigidly carries a stylus 46 projecting through the bottom of the pick-up head 26 directly beneath the skid 43 is carried by two parallel long flat spring ligaments 47, 48 which extend for nearly the whole length of the stator member 40 and are anchored at their rear ends to bosses respectively on top of and at the bottom of the stator member 40, the projecting stylus 46 riding along the test surface during traversing of the pick-up head 26. The central portion of the upper ligament 47 is interrupted by a rigid member 49 which carries the relatively moving element 50 of an electromagnetic transducer, whose relatively stationary element 51 is carried by the stator member 40. The second member 44 thus constitutes a connecting member between the stylus 46 and the relatively moving element 50 of the transducer. A light spring 52 whose tension can be adjusted, is provided to interconnect the stator member 40 and this connection member 44, the spring 52 acting, during use of the apparatus, to maintain the stylus 46 in engagement with the test surface while the skid 43 is in engagement with the reference surface 29. An external hand knob, not shown, is provided for adjusting the tension of this spring 52 and therefore for adjusting the contact pressure between the stylus 46 and the test surface. Conveniently, the relatively stationary element 51 of the transducer consists of a magnetic core in the form of an open ended cylinder 53 provided with a coil, whilst the relatively moving element 50 consists of a plunger of magnetic material axially movable within such cylindrical core 53. The electrical output of the transducer is transmitted through flexible leads to an amplifier, not shown, whose output controls a pen recorder.

Thus, in operation, when a workpiece 16 has been properly located on its work support 15, the handwheel 14 is operated to lower the carriage 12 on the vertical column 11 to bring the nosepiece 34 into engagement with the test surface on the workpiece 16, such operation being continued until the nosepiece 34 has caused the casing 24 to move about its hinge 22 sufficiently to bring the two index marks into register. At this stage, as has already been explained, the reference surface 29 will be substantially parallel to the test surface at such a distance therefrom that the stylus 46 will also be in engagement with the test surface. The electric motor is now operated to effect a preliminary traverse at the relatively fast speed. During this traversing movement, the skid 43 will ride along the reference surface 29 and the stylus 46 will ride along the test surface, and the stylus 46 will perform small working movements approximately at right angles to the test surface in accordance with the actual contour of the test surface. Such working movements, greatly amplified, are recorded on the chart of the recording instrument, not shown. The purpose of the preliminary high speed traverse is to determine whether the parts of the apparatus have been set sufficiently accurately in their operative position. Thus, an error in parallelism will appear as a general slope of the trace on the chart and in view of the great magnification even a small error in this respect may take the trace off the edge of the chart within the limits of the desired long traverse. If so, the hand-wheel 14 must be further operated in the appropriate direction to correct the error in parallelism to bring the whole trace back on to the chart. Again, if the trace lies too high or too low on the chart, this can be corrected by a slight adjustment of the nosepiece 34 on the casing. As soon as a preliminary high speed traverse indicates that the trace is conveniently positioned on the chart, the apparatus is ready for a traverse at the operational relatively slow speed, chosen to suit the nature of the surface so that an accurate amplified record of the surface contour will be obtained, the trace showing all the crests and valleys due to roughness of the surface. A mean line drawn through the oscillations of the trace will give an indication of the general shape of the surface, and will reveal any differences from the shape of the accurate reference surface 29, which acts as the datum with which the test surface is compared, and thus any departures of the test surface from straightness.

It will be appreciated that the apparatus, although described with reference to straightness testing, can, if desired, also be used for examining the roughness or the waviness of the surface, although in general a much shorter traverse than is required for straightness testing would be amply sufficient for such purposes. If the apparatus is intended to be used, at will, both for straightness testing and for roughness testing, it is desirable to provide in addition an integrating meter, which is operated in the manner well-known in itself by the ouput of the amplifier to give an indication of the average roughness of the surface over a predetermined short traverse at a predetermined speed of traversing.

In the foregoing description the nosepiece has been described as engaging with the test surface itself. This however is not essential to the invention, and, if preferred, the arrangement could be such that the nosepiece engages instead with a surface provided for the purpose on the work support, the effective length of the nosepiece of course being adjusted in such case to take account of the difference of level between such surface and the workpiece surface. In one convenient arrangement of this kind, the nosepiece, adjustably mounted on the casing as above described, terminates at its lower end in a ligament hinge by which it is connected to a forked member, which straddles the workpiece, the two limbs of such member having rounded ends which respectively engage with two surfaces on the work support, one on either side of the workpiece, thus avoiding strain on the casing which would be produced by one-sided engagement of the nosepiece with the work support and would give rise to errors in the desired straightness test. Alternatively, the nosepiece could be replaced by a simple adjusting screw carried by the casing, the work-support or the base being provided with an upstanding fixed bracket, with a surface of which such screw engages.

It will be appreciated that the use of a parallel ligament support for the connecting member, which carries the stylus, has the advantage that, if desired, the stylus may be detachable from such connecting member, so that it can be replaced when desired by an alternative stylus at the lower end of a vertical rod. This makes it possible, for example, to test the surface at the bottom of a relatively deep groove in a workpiece. Of course, the effective length of the nosepiece must be appropriately adjusted in such case to suit the change of level of the test surface.

In some instances, the nature of the workpiece may be such that its surface to be tested cannot readily be engaged by the stylus projecting from the bottom of the pick-up head. A typical instance of this is for the testing of the internal surface of a small bore. Such cases can be dealt with by providing an extension fitting for the pick-up head, which can be attached to the front of the pick-up head.

In one convenient construction for such extension fitting, the attachment member by which it is secured to the front end of the pick-up head, carries two parallel ligament hinges, one above the other, the front ends of which are attached to a member, at the top of which is mounted an auxiliary skid engaging with the reference surface, and at the bottom of which is provided a vertical ligament constituting the fulcrum of a two-armed lever. One arm of this lever consists of a forwardly extending rod, of sufficiently small cross-section to be able to penetrate into the workpiece bore, such rod carrying near its front end an auxiliary stylus for engaging with the test surface in the bore. The rearwardly extending second arm of this lever carries an adjustable abutment which presses against the stylus projecting from the bottom of the pick-up head. A spring is provided between the lever and the member to which the lever is fulcrumed to urge the lever properly into engagement at one end with the test surface and at the other end with stylus.

I claim:
1. Surface testing apparatus, more especially for testing the straightness of a surface, comprising
   (a) a base;
   (b) a work support on the base for carrying a workpiece whose surface is to be tested;
   (c) a column extending generally upwardly from the base;
   (d) a carriage;
   (e) means adjusting the carriage vertically along the column;
   (f) a casing carried by the carriage;
   (g) a pick-up movably mounted on such casing;
   (h) means for applying to the pick-up head a nominally straight traversing movement relatively to the casing;
   (i) a stator member carried by the pick-up head;
   (j) a stylus for engaging the workpiece surface to be tested;
   (k) a connecting member carrying the stylus;
   (l) hinge means pivotally supporting the connecting member from the stator member, and defining a hinge axis perpendicular to said direction of traversing movement;
   (m) a transducer having relatively stationary and relatively movable elements rigidly mounted on the stator member and the connecting member respectively, whereby the transducer is operated by working movements of the stylus in engagement with the test surface during tranversing movement of the pick-up head,
and further including the improvement which comprises:
   (n) an accurate reference surface carried by said casing and extending substantially parallel to the direction of said traversing movement of the pick-up head;
   (i) a skid rigidly mounted on the stator member and engaging the said reference surface, and
   (p) a resiliently biassed ligament hinge interconnecting the stator member and pick-up head for relative rocking movement about an axis parallel to the axis of said hinge means, and biassing the skid into engagement with said reference surface upon traversing movement of the pick-up head.

2. Surface-testing apparatus as claimed in claim 1, including means for ensuring approximate parallelism between the reference surface and the test surface, comprising a hinge connection between the carriage and the casing having a hinge axis at right angles to the direction of traversing of the pick-up head, and two parts in abutting engagement respectively carried by the casing and by the base.

3. Surface-testing apparatus as claimed in claim 1, including means for adjusting one of the two parts in abutting engagement to suit a desired separation between the reference surface and the test surface.

4. Surface-testing apparatus as claimed in claim 3, in which the two parts in abutting engagement are constituted respectively by a steadying arm adjustably mounted on the casing and by the test surface.

5. Surface-testing apparatus as claimed in claim 3, in which the two parts in abutting engagement are constituted respectively by a fixed bracket on the base or on the work support extending close to the casing and by an adjustable abutment on the casing.

6. Surface-testing apparatus as claimed in claim 1, including means responsive to the movement of the casing about its hinge relatively to the carriage for indicating when the movement of the carriage along the column has brought the casing into a position in which the reference surface is approximately parallel to the test surface.

7. Surface-testing apparatus as claimed in claim 1, including an extension fitting for the pick-up head comprising a first member attached to the pick-up head, a second member carrying an auxiliary skid engaging with the reference surface, ligament hinges in parallel linkage formation by means of which such second member is carried by the first member, an auxiliary stylus, and a two-armed lever hinged to the said second member and carrying the auxiliary stylus on one arm whilst the other arm abuts against the main stylus; whereby with the auxiliary stylus in engagement with the test surface the working movements thereof approximately normal to the test surface during the traversing movement are transmitted through the main stylus to the transducer.

8. Surface-testing apparatus as claimed in claim 1, in which the means supporting the pick-up head from the casing comprises two parallel guide rails in the casing, a sleeve rigidly connected to the pick-up head and mounted to slide along the first guide rail, and a bracket on the sleeve engaging with the second guide rail preventing rotation of the sleeve around the first guide rail.

9. Surfacing-testing apparatus as claimed in claim 1, in which the hinge means displaceably attaching the connecting member to the stator member comprise a plurality of ligament hinges arranged in parallel linkage formation and permitting displacement of the stylus relative to the stator in a direction perpendicular to the direction of said traversing movement.

References Cited

UNITED STATES PATENTS

| | | | |
|---|---|---|---|
| 2,396,394 | 3/1946 | Shaw | 73—105 |
| 3,208,272 | 9/1965 | Hall et al. | 73—105 |
| 3,283,568 | 11/1966 | Reason | 73—105 |

CHARLES A. RUEHL, Primary Examiner

H. GOLDSTEIN, Assistant Examiner

U.S. Cl. X.R.

73—105